United States Patent
Kilner et al.

(10) Patent No.: US 6,732,979 B1
(45) Date of Patent: May 11, 2004

(54) STEER-BY-WIRE TILLER WITH POSITION FEEL SYSTEM

(75) Inventors: Jerome R. Kilner, Bellevue, WA (US); Andrew M. Valaas, Bellevue, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/652,538

(22) Filed: Aug. 28, 2003

(51) Int. Cl.$^7$ ................................................. B62D 5/04
(52) U.S. Cl. ....................................... 244/236; 180/402
(58) Field of Search ........................... 244/236; 180/401, 180/402, 403; 701/41, 42, 43

(56) References Cited

U.S. PATENT DOCUMENTS

| | | |
|---|---|---|
| 6,208,923 B1 | 3/2001 | Hommel |
| 6,535,806 B2 | 3/2003 | Millsap et al. |
| 6,548,969 B2 | 4/2003 | Hennings et al. |
| 6,550,565 B2 | 4/2003 | Thomas et al. |
| 6,678,597 B2 * | 1/2004 | Amberkar ..................... 701/41 |
| 2002/0033301 A1 | 3/2002 | Clephas |
| 2002/0070070 A1 | 6/2002 | Andonian et al. |
| 2002/0079155 A1 | 6/2002 | Andonian et al. |
| 2002/0084757 A1 | 7/2002 | Ewbenk et al. |
| 2002/0103589 A1 | 8/2002 | Millsap et al. |
| 2002/0107621 A1 | 8/2002 | Byers et al. |
| 2002/0108804 A1 | 8/2002 | Park et al. |
| 2002/0161499 A1 | 10/2002 | Radamis et al. |
| 2003/0009272 A1 | 1/2003 | Kalo et al. |
| 2003/0014169 A1 | 1/2003 | Kalo et al. |
| 2003/0019685 A1 | 1/2003 | Graber et al. |
| 2003/0032523 A1 | 2/2003 | Kalo et al. |

* cited by examiner

*Primary Examiner*—Charles T. Jordan
*Assistant Examiner*—Stephen Holzen
(74) *Attorney, Agent, or Firm*—Black Lowe & Graham PLLC (57) ABSTRACT

A system and a method for generating a signal to control a steering mechanism and an aircraft using the system are disclosed. A tiller module includes a moveable tiller base configured to moveably respond to a steering signal. The tiller module also includes a tiller coupling configured to couple the tiller with the moveable tiller base and further configured to generate a tiller differential signal indicative of a steering force applied to the tiller relative to a position of the moveable tiller base. A tiller controller is configured to receive the tiller differential signal and a steering mechanism position signal. The tiller controller is further configured to generate the steering signal to direct a steering mechanism to conform with the steering force and to direct the moveable tiller base of each tiller module to a feedback position representative of a current position of the steering mechanism.

84 Claims, 6 Drawing Sheets

STEER-BY-WIRE TILLER WITH POSITION FEEL SYSTEM

FIELD OF THE INVENTION

This invention relates generally to aircraft control and, more specifically, to control of steerable aircraft landing gear.

BACKGROUND OF THE INVENTION

Steer-by-wire systems can greatly simplify design and sometimes, operation of moving vehicles. Designing a mechanically-steered vehicle typically involves positioning operator controls close enough to steering devices to permit the operator controls to engage turnable wheels or steerable nose gear. To take the example of an automobile, a conventional rack and pinion steering mechanism involves placing the steering column such that one end is directly coupled to the front wheels and an opposite end is positioned in front of a driver's seat. Once the steering column is in place, other drive train and supporting components are positioned around the steering column under the hood, and the dashboard and other operator controls are positioned around the steering column in the passenger compartment Therefore, significant design aspects of the automobile are dictated by a functionally-dictated placement of the steering controls.

Similarly, placement of mechanical operator controls for a nose gear steering mechanism for an aircraft also dictates aspects of the design of the aircraft and flight deck. A tiller serving as an operator control for the nose gear steering mechanism is placed to enable practical access to nose gear steering hydraulics. Design limitations are even more restrictive when considering the duplicate operator controls which commonly are used in aircraft flight deck. For example, providing two tillers to control a nose gear steering mechanism not only involves placing a first tiller with a practical mechanical linkage to the nose gear steering mechanism, but also involves placing a second tiller where it can be mechanically linked with the nose gear steering system or with the first tiller. Although the second tiller does not have to be coupled directly with the nose gear steering system, having a mechanical linkage between the two tillers may limit how other devices can be installed in the cockpit around and between the tillers.

Using steer-by-wire controls to operate the nose gear steering system can alleviate some of these placement and design concerns. In a steer-by-wire system, a mechanical linkage between operator controls and the steering device is replaced with an electrical system, thereby obviating the need for a direct mechanical linkage between the operator controls and the steering device. More specifically, the operator controls are linked with an electrical transducer that reads the operator input and generates an electrical signal representative of the operator input. The representative electrical signal is communicated to a corresponding electrical driver coupled with the steering mechanism, and the electrical driver directs the steering mechanism in a direction corresponding to the operator input. Accordingly, the steering mechanism is controlled by the operator as he or she might control it using a mechanical linkage but without there having to be mechanical linkages between the operator controls and the steering mechanism.

However, steer-by-wire systems present concerns not shared in systems employing mechanical linkages. For example, steer-by-wire systems do not naturally present feedback to an operator in the way that mechanically-linked systems do. Once more considering the example of an automobile, a mechanical linkage presents steering resistance to the operator in proportion to the resistance caused by the sharpness of the turn. Also, while a mechanically-linked steering wheel naturally spins back to normal as the steered wheels return to a straight-ahead position, there is no such natural response imparted to operator controls in a steer-by-wire system. Returning the steer-by-wire controls to an original position involves an application of an impetus to return the controls to such a neutral position.

The example of nose-wheel steering in an aircraft having duplicate controls presents an additional concern. In a steer-by-wire system, it is possible that the pilot and co-pilot might both be trying to control the nose-wheel steering system, and the force being applied by one operator might not be communicated to the other operator through the controls. Accordingly, the operators conceivably might be applying contradictory inputs to the control devices without the other operator knowing of it, defeating both their purposes. In an extreme case, both operators might apply equal force to the control devices thereby resulting in an excessive net steering input. Also, if such steering problems occur, and one operator suddenly releases his or her control, the response of the steering system to the unopposed or unsupported force on the control still being maintained could result in under-steering or over-steering.

Thus, there is an unmet need in the art for a steer-by-wire system that provides feedback through the operator controls reflecting a status of the steering mechanism. There also is an unmet need for a steer-by-wire system for providing non-mechanical linking between multiple operator controls such that each of the operators can be apprised of the effect on the steering mechanism resulting from other operators' actions.

SUMMARY OF THE INVENTION

The present invention provides a steer-by-wire steering system and method providing feedback to one or more operator controls indicative of a position of the steering mechanism, and an aircraft using the system. Embodiments of the present invention use a tiller module in which a tiller is coupled with a moveable base. The tiller is movably secured to the base so as to be moveable within a range of a few degrees relative to the base or is rigidly secured to the base. Force applied to the tiller by an operator is determined by measuring the relative displacement of the tiller relative to the moveable base or by measuring strain in the tiller relative to the base. A differential signal is measured and applied to a tiller controller which generates a steering signal to the steering mechanism. A steering mechanism monitoring position device communicates a position signal back to the tiller module causing the moveable base to be moved to reflect a position of the steering mechanism. When multiple tiller modules are used, differential signals measured at each tiller module are summed and provided to the tiller controller. A steering mechanism monitoring position device communicates the position signal back to each of the tiller modules causing the moveable bases to be moved such that each tiller reflects a position of the steering mechanism.

More particularly, embodiments of the present invention provide a system and a method for generating a signal to control a steering mechanism. A tiller module includes a moveable tiller base configured to moveably respond to a steering signal. The tiller module also includes a tiller coupling configured to couple the tiller with the moveable tiller base and further configured to generate a tiller differential signal indicative of a steering force applied to the tiller relative to a position of the moveable tiller base. A tiller controller is configured to receive the tiller differential signal and a steering mechanism position signal. The tiller controller is further configured to generate the steering signal to direct a steering mechanism to conform with the steering force and to direct the moveable tiller base to a feedback position representative of a current position of the steering mechanism.

In accordance with further aspects of the present invention, the tiller coupling includes a centering spring mechanism configured to receive the tiller and allow movement of the tiller relative to the moveable tiller base within a predetermined displacement range. The tiller input coupling includes a tiller position transducer configured to measure a displacement of the tiller and generate the tiller differential signal. Alternatively, the tiller input coupling also includes a force transducer configured to generate the filler differential signal as a function of a strain resulting from the steering force applied to the tiller relative to the position of the moveable tiller base. In embodiments of the present invention, the tiller includes a rotatable handle and the moveable tiller base includes a rotatable base moveable by a motor receiving the steering signal.

In accordance with further aspects of the present invention, the tiller controller converts the tiller differential signal into the steering signal such that the moveable tiller base of each tiller module is moved to cause the tiller to be aligned to a position representative of the steering mechanism position signal. The tiller controller integrates the tiller differential signal such that a rate of change of the steering signal is proportional to a magnitude of the steering force. The tiller controller further includes a steering signal decay function such that a reduction in the tiller differential signal causes a resulting reduction in the steering signal causing the steering mechanism and the moveable tiller base to return toward a neutral position. The tiller controller further includes a position limiter restricting the tiller such that the feedback position of the tiller is representative of the current position of the steering mechanism.

In accordance with still further aspects of the present invention, redundant components are used to allow the steering system to continue to operate even when some components have failed. Redundant secondary components suitably are configured to perform the same functions as primary components. The secondary components can quickly replace the function of failed primary components allowing the steer-by-wire system to continue to function. In addition, a steering system using multiple tiller modules provides fault tolerance in that, should one tiller module fail, steering can still be controlled using the other tiller modules.

In accordance with further aspects of the present invention, the tiller module includes a first tiller module having a first moveable tiller base configured to receive a first tiller that is configured to receive a first steering force and a second tiller module having a second moveable tiller base configured to receive a second tiller that is configured to receive a second steering force. The first tiller module generates a first tiller differential signal and the second tiller module generates a second tiller differential signal. The tiller controller sums the first tiller differential signal and the second tiller differential signal such that the steering signal is generated to direct the steering mechanism to conform with a composite of the first steering force and the second steering force. The steering signal causes both the first moveable tiller base and the second moveable tiller base to move to a feedback position representative of the current position of the steering mechanism.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention provide a system and a method for generating a signal to control a steering mechanism. A tiller module includes a moveable tiller base configured to moveably respond to a steering signal. The tiller module also includes a tiller coupling configured to couple the tiller with the moveable tiller base and further configured to generate a tiller differential signal indicative of a steering force applied to the tiller relative to a position of the moveable tiller base. A tiller controller is configured to receive the tiller differential signal and a steering mechanism position signal. The tiller controller is further configured to generate the steering signal to direct a steering mechanism to conform with the steering force and to direct the moveable tiller base of each tiller module to a feedback position representative of a current position of the steering mechanism.

Figure 1:
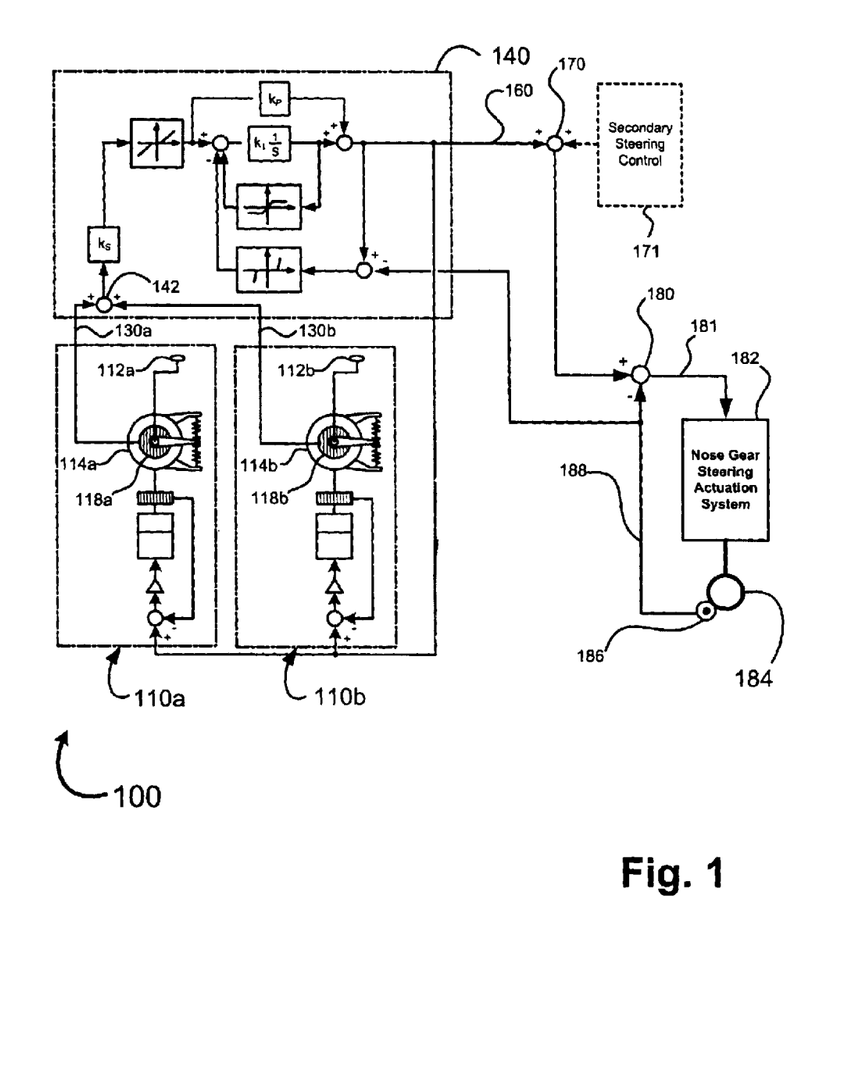
FIG. 1 is a block diagram of a steer-by-wire system in accordance with an embodiment of the present invention.

FIG. 1 is a block diagram of a steer-by-wire system 100 for an aircraft (not shown) in accordance with an embodiment of the present invention. The steer-by-wire system 100 controls steering of nose gear 184. The steer-by-wire system 100 incorporates two tiller modules 110a and 110b, a tiller controller 140, a nose gear steering actuation system 182, a nose gear position sensor 186, and two summers 170 and 180. In the configuration of FIG. 1, the steer-by-wire system 100 provides dual tiller modules 110a and 110b so that, for example, a captain and a first officer each can have his or her own tiller for steering the nose gear 184 of the aircraft. The steer-by-wire system 100 will be in explained in more detail below and with regard to FIGS. 2 and 3.

Although the steer-by-wire system 100 is configured for aircraft steering, it will be appreciated that the steer-by-wire system 100 is adaptable for other systems in which a steer-by-wire system 100 affording advantages of the present invention are desired. For example, embodiments of the present invention could be used for land or water-based conveyances, heavy machinery, cranes, or other devices. The tiller could be in the form of a steering wheel, a yoke, a lever, or another operator control device. Also, although FIG. 1 shows a system 100 employing dual tiller modules 110a and 110b to take advantage of electrically linked feedback unifying operation of the dual tiller modules 110a and 110b, the present invention offers a steering position feedback system which provides advantages in a single-tiller-system as well as for multiple-tiller systems.

More specifically in the dual-tiller steer-by-wire system 100, each of the tiller modules 110a and 110b receives a tiller 112a and 112b in a moveable base 114a and 114b, respectively. When an operator applies force to the tiller 112a and 112b, tiller sensors 118a and 118b generate differential output signals 130a and 130b. The differential output signals 130a and 130b are received by the tiller controller 140. The differential output signals 130a and 130b are added at a summer 142.

The tiller controller 140 processes the tiller differential signals 130a and 130b as will be further described in connection with FIG. 3. In addition to the tiller differential signals 130a and 130b, the tiller controller 140 also receives a nose gear position signal 188 from a nose gear position sensor 186 coupled with the nose gear 184. Using the tiller differential signals 130a and 130b and the nose gear position signal 188, the tiller controller generates a steering signal 160. The steering signal 160 represents a desired position of the nose gear 184. At a summer 170, the steering signal 160 can be added to an output of a secondary steering system 171 if such a secondary steering system 171 is desired to supplement the tillers 112a and 112b. Assuming no such secondary steering system 171 augments the steering signal 160, the steering signal 160 is fed to the summer 180. At the summer 180, the nose gear position signal 188 is subtracted from the steering signal 160. An output 181 of the summer 180 is input to the nose gear steering actuation system 182. The nose gear steering actuation system 182 steers the nose gear 184 according to the magnitude and sign of the output 181 of the summer 180.

Thus, when the steering signal 160 exceeds the nose gear position signal 188, the output 181 generated by the summer 180 is positive. A positive output 181 from the summer 180, that is in turn input to the nose gear actuation system 182, causes the nose gear 184 to be steered in what is defined as a positive direction toward the desired steering position indicated by the steering signal 160. A positive direction, for example, may be defined as clockwise or counterclockwise according to the perspective of FIG. 1. On the other hand, when the nose gear position signal 188 exceeds the steering signal 160, the output 181 generated by the summer 180 is negative. A negative output 181 from the summer 180 input to the nose gear actuation system 182 steers the nose gear 184 in what is defined as a negative direction toward the desired steering position indicated by the steering signal 160. When the steering signal 160 and the nose gear position signal 188 are equal, the signals 160 and 188 negate each other at the summer ISO, thereby resulting in a zero output 181 from the summer 180. A zero output 181 from the summer 180 means a zero signal is applied to the nose gear steering actuation system 182, thereby causing the nose gear 184 to remain at its current position.

As the steering signal 160 is input to the nose gear steering actuation system 182, the steering signal 160 is also supplied to the tiller modules 110a and 110b. In response to the steering signal 160, the moveable bases 114a and 114b of the tiller modules 110a and 110b are rotated to reflect a position of the nose gear wheels 184. Rotating the moveable bases 114a and 114b in turn moves the tillers 112a and 112b. As a result, the steer-by-wire system 100 provides visible and tactile feedback to the tillers 112a and 112b thereby reflecting position of the nose gear 184. Moreover, in a multiple-tiller environment, like the dual-tiller 112a and 112b configuration of the steer-by-wire system 100 of FIG. 1, the tillers 112a and 112b are electrically linked to the nose gear 184 and each other.

Advantageously, visual and/or tactile feedback is provided to the tillers 112a and 112b without a mechanical linkage between the tillers 112a and 112b and the nose gear 184 or the nose gear steering actuation system 182. Such feedback is available and helpful to an operator of a single-tiller system or a multiple-tiller system. In the case of a multiple-tiller system, if a first operator directs his or her tiller 112a to steer the nose gear 184 to a new position, a second operator using his or her tiller 112b will have visible and/or tactile feedback of the position of the nose gear 184. This linked feedback can avoid a problem of the operators applying opposing control forces to the tillers 112a and 112b or over-steering as a result of an operator not having feedback as to a position of the nose gear or the actions being undertaken by another operator.

Figure 2:
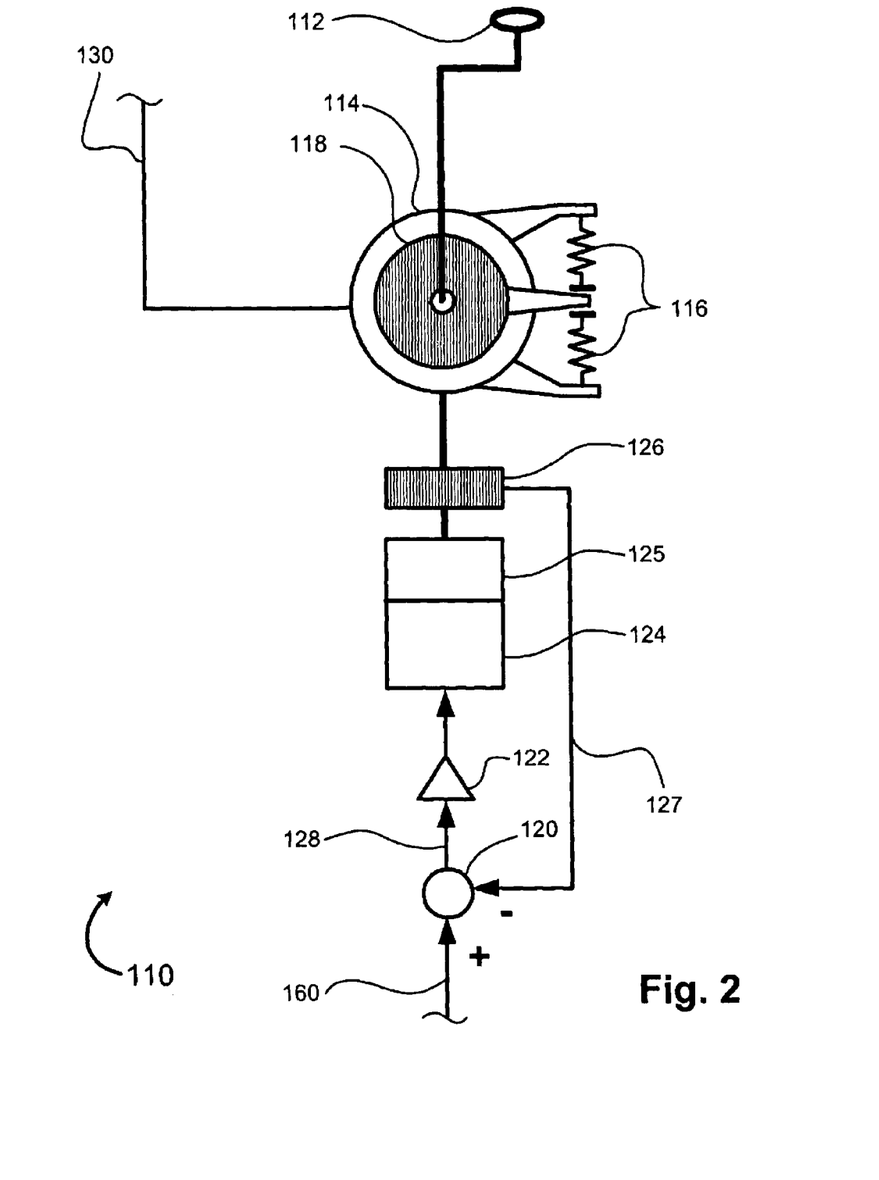
FIG. 2 is a block diagram of a tiller module in accordance with an embodiment of the present invention.

FIG. 2 shows an enlarged view of the structure of a tiller module 110, like tiller modules 110a and 110b (FIG. 1). The tiller sensor 118 generates a differential output signal that is communicated to the tiller controller 140 (FIG. 1). In the embodiment shown in FIG. 2, the tiller 112 is movably mounted in the moveable base 114 such that the tiller 112 can be rotationally moved relative to the moveable base 114 by at least a small degree. Movement of the tiller 112 relative to the moveable base 114 is restricted by centering springs 116. In the embodiment shown, the tiller sensor 118 suitably is a displacement sensor which generates an electrical signal reflecting a degree of rotational displacement the operator has imparted to the tiller 112. The electrical signal generated by the tiller sensor 118 constitutes the differential output signal 130 from the tiller module 110. The centering springs 116 oppose rotational movement of the tiller 112, and thus will cause the tiller 112 to return to a neutral position relative to the moveable base 114 once the operator has released the tiller 112 or has otherwise ceased imparting any rotational displacement to the tiller 112.

Alternatively to the tiller 112 being movably mounted to the moveable base 114, the tiller 112 suitably is rigidly mounted to the moveable base 114 such that the tiller 112 is not moveable relative to the moveable base 114. In such an embodiment, the tiller sensors 118i and 118ii suitably are strain gauges. Thus, instead of measuring the force applied to the tiller 112 by the operator as a function of the displacement of the tiller 112 relative to the moveable base 114, the force is measured as a function of the strain resulting from the force applied to the tiller relative to the moveable base 114.

As will be further explained in connection with FIG. 3, the tiller controller 140 receives the differential output signal 130 (or signals 130a and 130b in a multiple tiller environment as depicted in FIG. 1) and generates a steering signal 160. The steering signal 160 is received at the tiller module 110 at a summer 120, whose operation will be further described below. An output 128 of the summer 120 is received by an amplifier 122 which amplifies the signal-strength current to a suitable drive-current which is fed to a position servo motor 124. The position servo motor 124 in turn drives a gear head 125 which rotates the moveable base 114. The position of the moveable base is measured by a position sensor 126. A position output 127 of the position sensor 126 is fed back to the summer 120.

At the summer 120, the position output 127 is subtracted from the steering signal 160. The operation of the summer 120 is analogous to the function of the summer 180 (FIG. 1) triggering the nose gear actuation system 182. The steering signal 160 again reflects the desired position of the nose gear 184. The position output 127 of the position sensor 126 reflects the actual position of the moveable base 114. If the steering signal 160 exceeds the position signal 127, the output 128 of the summer 120 will be positive. A positive output 128 from the summer 120 that is in turn input to the amplifier 122, the position servo motor 124, and the gear head 125 rotates the moveable base 114 in what is defined as a positive direction toward the desired steering position indicated by the steering signal 160. A positive direction, for example, may be defined as clockwise or counterclockwise as desired according to the perspective of FIG. 1. On the other hand, when the position signal 127 exceeds the steering signal 160, a negative output 128 is generated by the summer 120. A negative output 128 from the summer 120 that is in turn input to the amplifier 122, the position servo motor 124, and the gear head 125 rotates the moveable base 114 in what is defined as a negative direction toward the desired steering position indicated by the steering signal 160. When the steering signal 160 and the position signal 127 are equal, the signals 160 and 127 negate each other at the summer 120, thereby resulting in a zero output 128 from the summer 120. A zero output 128 from the summer 120 means a zero signal is applied to the amplifier 122, the position servo motor 124, and the gear head 125, thereby causing the moveable base to 114 to remain at its current position.

In an implementation having multiple tiller modules 110 like the system 100 (FIG. 1), the steering signal 160 is provided to each of the tiller modules 110. In accordance with the previously-described operation of a tiller module 110, interaction of the steering signal 160 with the position signal 127 of the position sensor of each tiller module 110 results in the moveable base 114 of each tiller module 110 being moved to reflect the position of the nose gear 184. Thus, the tiller modules 110 each provide feedback to their operators of the position of the nose gear 184. Again, as also previously described, use of multiple tiller modules 110 provides redundancy in case one of the tiller modules—or one of the operators of one the tiller modules 110—should become disabled. As previously described, the operation of the tiller controller 140 receives differential output signals 130a and 130b from multiple tiller modules 110a and 110b, respectively, thereby allowing multiple operators to simultaneously steer the system 100.

In a tiller module 110, redundant components or other fault tolerant structures may be incorporated to allow the tiller module 110 to operate in the event of a failure of one or more components. For example, electrical components, such as the tiller sensor 118, summer 120, amplifier 122, and other components could be duplicated. The output of the components could be monitored using known fault tolerant techniques to ensure that a reliable output signal of each component is generated and to circumvent or replace failing components when reliable output signals are not produced. Mechanical components, such as the moveable base 114 and the position servo motor 124 desirably are sufficiently robust so that redundant mechanical components can be omitted. However, if desired, redundant position servo motors 124 could be implemented in the tiller module 110 with the outputs of the redundant servo motors 124 supplied to a differential, for example, so that if one position servo motor 124 should fail the remaining, functional servo motor 124 could actuate the moveable base 114. Various known fault tolerance strategies optionally could be used with embodiments of the tiller module 110, or embodiments of the tiller module 110 may be used without fault tolerance. In any case, the present invention is not limited to embodiments using fault tolerant devices, let alone any particular fault tolerance implementations.

A further advantage of having the tiller 112 mounted on the moveable base 114 is for failure modes. For example, even a complete, hard-over failure of the position servo motor 124 will not result in an erroneous steering input signal. By virtue of the moveable base 114 and the tiller controller 140 (FIG. 1) using a differential output signal 130 in driving the nose gear 184, occurrence of a hard-over failure will not result in generation of a hard-over steering signal that could cause a steering mishap. In fact, failure of the position servo motor 124, in itself, will not result in any steering signal at all. Nonetheless, even if the moveable base 114 should become jammed in position as the result of a position servo motor 124 malfunctioning, steering commands still could be entered using the tiller 112 because the tiller controller 140 continues to receive the differential output signal resulting from pressure being applied to the tiller 112 as read relative to the position of the movable base 114. In other words, even if the position servo motor 124 failed to move the moveable base 114, while nose gear position feedback would no longer be provided to the operator, the operator could continue to steer.

Figure 3:
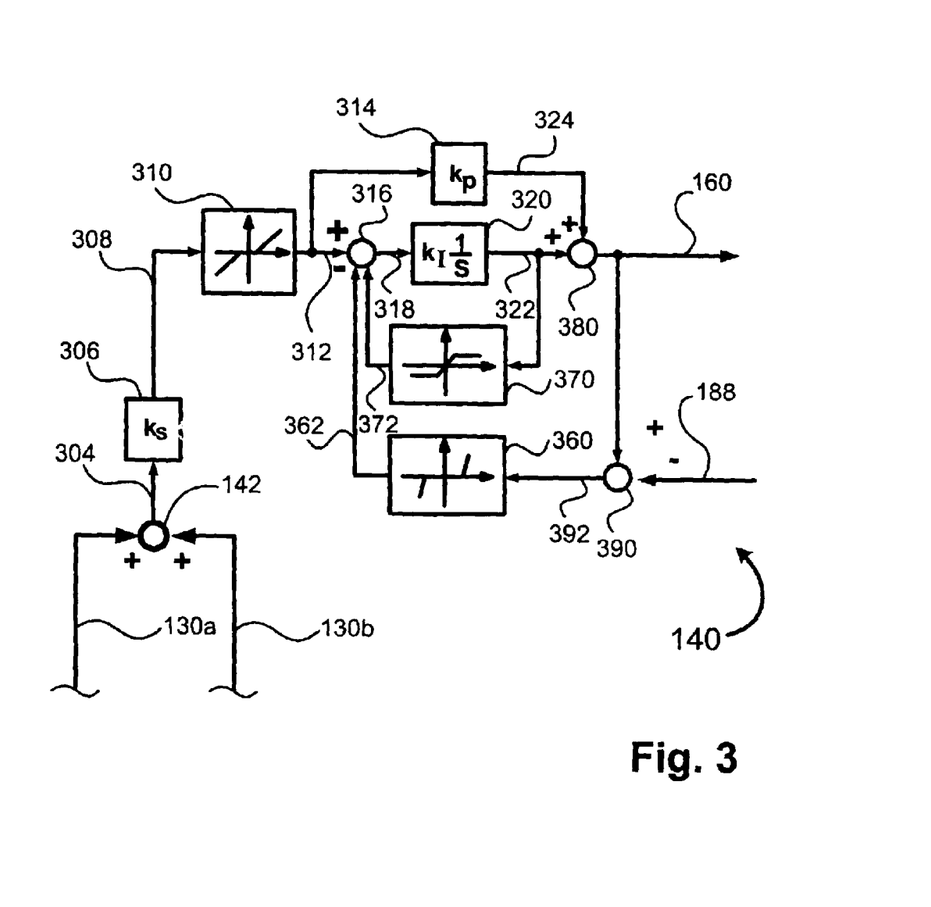
FIG. 3 is a block diagram of a tiller controller in accordance with an embodiment of the present invention.

FIG. 3 is a block diagram of a tiller controller 140 in accordance with an embodiment of the present invention. The differential output signals 130a and 130b are added at a summer 142, with an output 304 of the summer 142 supplied to a scaling factor module 306. The scaling factor module 306 is used in an embodiment in which the tiller sensors 118 (FIGS. 1 and 2) suitably are strain gauges rather than displacement sensors. When the tiller sensors 118 are strain gauges, a scaling factor can be applied by the scaling factor module 306 to scale a magnitude of the signal generated by the strain gauges to represent a relative displacement signal between the tiller 112 and the moveable base 114. On the other hand, if the tiller sensors 118 are displacement sensors, the scaling factor applied by the scaling factor module 306 is unity because no scaling is called for. Using displacement sensors for the tiller sensors 118, the scaling factor module 306 could be eliminated.

An output 308 of the scaling factor module 306 is supplied to a tolerance module 310. The tolerance module 310 applies a "dead zone" to the output 308 of the scaling factor module 306, if used, such that very small forces initially applied to the tiller 112 result in no change in the steering of the system. In other words, the tolerance module 310 allows for a little "play" in the tiller 112. As a result, very small movements of the tiller 112 caused, for example, by an operator's hand twitching as a result of involuntary muscle movements, bumps or vibrations encountered by the vehicle or other small movements, are not immediately translated into movements of the nose gear 184.

The scaling factor module 306 and the tolerance module 310 yield a total of the differential output signals 130a and 130b adjusted for the type of tiller sensors 118 (FIG. 1) used and for slight, negligible movements of the tiller. The resulting output 312 of the tolerance module 310 is presented to both a proportional gain module 314 and a summer 316, an output 318 of which is presented to an integral gain module 320. An output 362 of a position limiter module 360 and an output 372 of a signal decay module 370 are subtracted from the output 312 of the tolerance module 310 at the summer 316. Putting aside the effect of the outputs 362 and 372, which will be described below, the proportional gain module 314 and the integral gain module 320 applied to the combined differential output signals 130a and 130b totaled at the summer 142 yields the steering signal 160. By integrating the differential output signals 130a and 130b, the steering signal 160 is proportional to the position of the tiller 112a and 112b. Further, by applying the proportional output 324 of the proportional gain module 314 to the summer 380, the rate of change of steering signal 160 is proportional to the force applied to the tillers 112a and 112b. The steering signal 160 is applied both to the nose gear steering actuation system 182 and the tiller modules 110a and 110b and used as previously described.

The output 362 of the position limiter module 360 and the output 372 of the signal decay module 370, which are subtracted from the differential output signals 130a and 130b at the summer 316, serve as limits on the steering signal 160.

The position limiter module 360 receives an output 392 of a summer 390. The output 392 of the summer 390 is the steering signal 160 minus the nose gear position signal 188. In other words, the output 392 of the summer 390 is the difference between the steering signal 160 and the nose gear position signal 188, which in turn is the difference between the current position of the nose gear and the desired position of the nose gear. The position limiter module 360 is configured to generate the output 362 to limit the rate of accumulation of the integral gain module 320.

More particularly, the position limiter module 360 is configured to limit the output 322 component of the steering signal 160 to prevent the steering signal from saturating the nose gear steering actuation system 182. The more easily saturated the nose gear steering actuation system 182, the greater the gain of the position limiter module 360. Thus, the signal decay module 360 is configured empirically based on the specifications of the nose gear steering actuation system 182.

By limiting the rate of increase of the steering signal 160, the position limiter module 360 also limits the rate at which the moveable bases 114 of the tiller modules 110a and 110b will move. Limiting the steering signal 160 limits the input to the position servo motors 124 that causes the moveable bases 114a and 114b of the filler modules 110a and 110b to rotate. Thus, limiting the steering signal 160 limits the ability of the operators to move the tillers 112.

Ultimately, the position limiter module 360 prevents the steering signal 160 and, thus, the tiller handle 112 from producing a position error signal 181 (FIG. 1) that significantly exceeds the rate capability of the steering actuation system 182. If this saturation occurs, the operator will experience a significant increase in the opposing force at the tiller handle 112 thereby providing tactile feedback of the nose wheel position similar to the tactile feedback provided by a mechanically controlled system.

The signal decay module 370 generates an output signal 372 that serves to reduce the steering signal 160. In mechanical steering systems, when the operator releases the steering controls, the steering mechanism tends to return to a neutral position, such as the way that a car steering wheel tends to rotate back to neutral when the drive lets go of the wheel. In a steer-by-wire system, it is desired that a signal be added to the system to mimic the mechanical self-neutralizing effect. The steering signal 160 is the sum of both the output 322 of the integral gain module 320 and the output 324 of the proportional gain module 314. Thus, even if no pressure is applied to the tillers 112a and 112b, the steering signal 160 will remain equal to that of the output 322 of the integral gain module 320. To provide for the steering signal 160 to decay to zero when no pressure is applied to the tillers 112a and 112b, the signal decay module 370 applies a gain to the output 322 of the integral gain module 320. As long as the output 322 of the integral gain module 320 is nonzero, indicating that the nose gear position is not neutral, a nonzero output 372 of the signal decay module is subtracted at the summer 316 to create a counter signal to offset the steering signal 160. As in the case of the position limiter module 360, the signal decay module 370 is configured empirically with regard to the specifications of the nose gear steering actuation system 182 to make sure that the nose gear steering actuation system 182 is not saturated.

In one exemplary embodiment of the system 100 used in a typical commercial aircraft, the following steering parameters may exist:

| | |
|---|---|
| Nose gear steering range | ±70 degrees |
| Actuation system no-load rate | 20 degrees/second |
| Servo valve saturation | ±4 degree equivalent steering command. |

In such a system, the following tiller system parameters might be used:

| | |
|---|---|
| Tiller handle range | ±70 degrees |
| Tiller handle length | 4 inches |
| Tiller handle spring rate | 2.0 pounds/degree |
| Tiller signal gain $k_s$ | 1.0 if relative position transducer used |
| | Tiller spring rate if load transducer used |
| Deadzone | ±0.5 degrees |
| kp | 1.0 |
| kI | 10.0 |
| Signal decay | ±2.0 degrees |
| Position limiter | ±4.5 degrees of deadzone |
| | then gain = 10 degrees/degree |
| Feel position servo bandpass | 10 to 20 radians/second |
| | (critically damped) |
| No-load rate | 30 to 40 degrees/second |
| Stall torque | 100 to 150 inch-pounds |

Using these parameters will result in the following tiller performance:

| Applied Tiller Force | Steady-State Commanded Steering Rate at (7) |
|---|---|
| 0.0 lbs | 0 deg/sec (at zero tiller position) |
| 9.0 lbs | 20 deg(sec (as an increasing steering command) |
| 5.0 lbs | 0 deg/sec (holding at a non-zero tiller position) |
| 0.0 lbs | −20 deg/sec (tiller released at non-zero position) |

In a tiller controller 140, as in the tiller module 110 (FIG. 2) redundant components or other fault tolerant structures may be incorporated to allow the tiller controller 140 to operate in the event of a failure of one or more components. Alternatively, the entire tiller controller 140 may be duplicated so that, if a fault is detected, the functions of a primary tiller controller 140 can be handled by a secondary tiller controller 140. Various known fault tolerance strategies optionally can be used with embodiments of the tiller controller 140, or embodiments of the tiller controller 140 may be used without fault tolerance. In any case, the present invention is not limited to embodiments using fault tolerant devices, let alone any particular fault tolerance implementations.

Figure 4A:
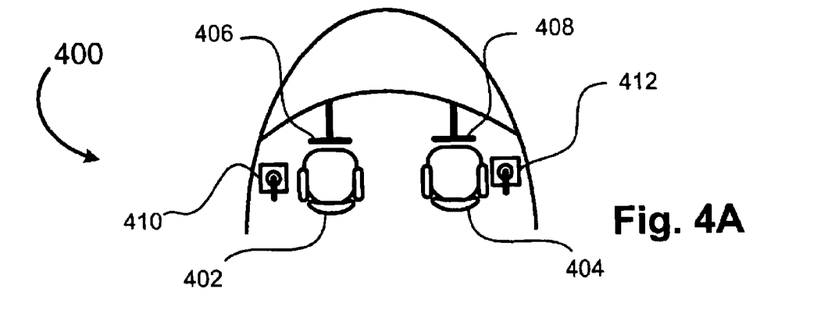
FIG. 4A is a top cutaway view of a flight deck of an aircraft equipped with an embodiment of the present invention.

FIG. 4A is a top cutaway view of a flight deck 400 of an aircraft equipped with an embodiment of the present invention. The flight deck 400 includes a captain's station 402 and a first officer's station 404. Both the captain's station 402 and the first officer's station 404 are equipped with flight controls, such as yokes 406 and 408, respectively, used to control the aircraft while in flight. Both the captain's station 402 and the first officer's station 404 also are equipped with tillers 410 and 412, respectively, according to an embodiment of the present invention that are used to steer the nose gear of the aircraft during push back, taxiing, and other ground operations of the aircraft. As previously described, the tillers 410 and 412 are equipped to provide tactile and visual feedback of the position of the nose gear. The tillers 410 and 412 are also electrically linked to coordinate the feedback between both tillers 410 and 412 so that an operator seated at the captain's station 402 and an operator seated at the first officer's station 404 will both be apprised of the position of the nose gear as the nose gear respond to steering commands directed by either operator.

Figure 4B:
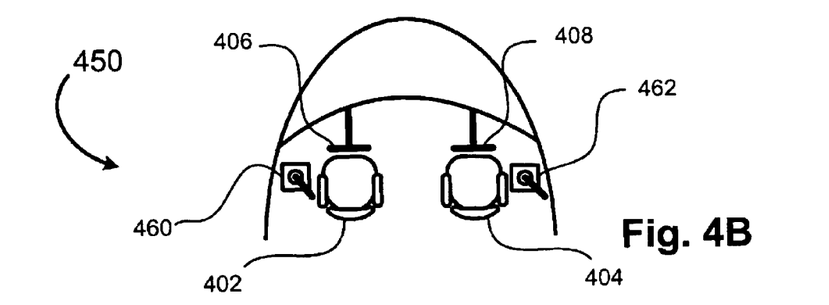
FIG. 4B is another top cutaway view of a flight deck of FIG. 4A.

FIG. 4B is a second top cutaway view of a flight deck 450 to show how tillers 460 and 462 are linked. As compared to the flight deck 400 (FIG. 4A), in the flight deck 450 the tillers 460 and 462 have been rotated counterclockwise by approximately forty-five degrees as compared to the tillers 410 and 412 (FIG. 4A). Either the tiller 460 at the captain's station 402 and the tiller 462 at the first officer's station 404 or both tillers 460 and 462 could be moved by the operators to the positions shown in the flight deck 450. In any case, embodiments of the present invention will coordinate the movements of the tillers 460 and 462. The coordinated movement of the tillers 460 and 462 provide coordinated feedback to the operators of the aircraft as to the position of the nose gear.

Figure 5:
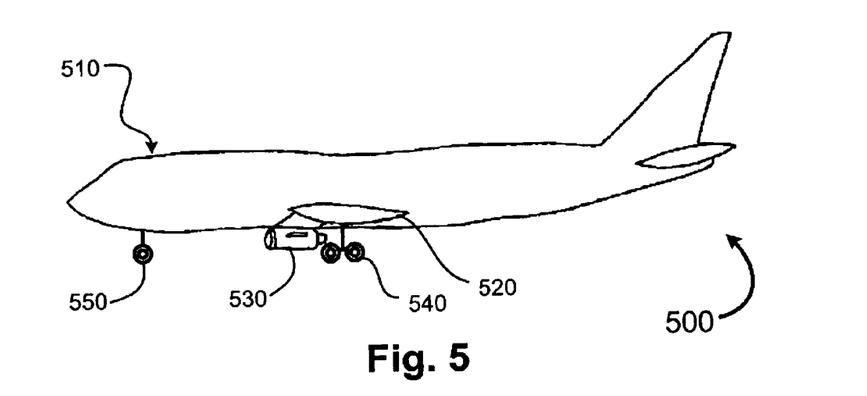
FIG. 5 is a side view of an aircraft equipped with an embodiment of the present invention.

FIG. 5 is a side view of an aircraft 500 that advantageously includes the system 100 (FIG. 1). As is known, the aircraft 500 includes a fuselage 510, wings 520, engines 530, control surfaces (not shown), main landing gear 540, and nose gear 550. The nose gear 550 are controlled by the tillers 410 and 412 (FIG. 4A) and 460 and 462 (FIG. 4b), and their positions will reflect the steering position of the nose gear as previously described.

Figure 6:
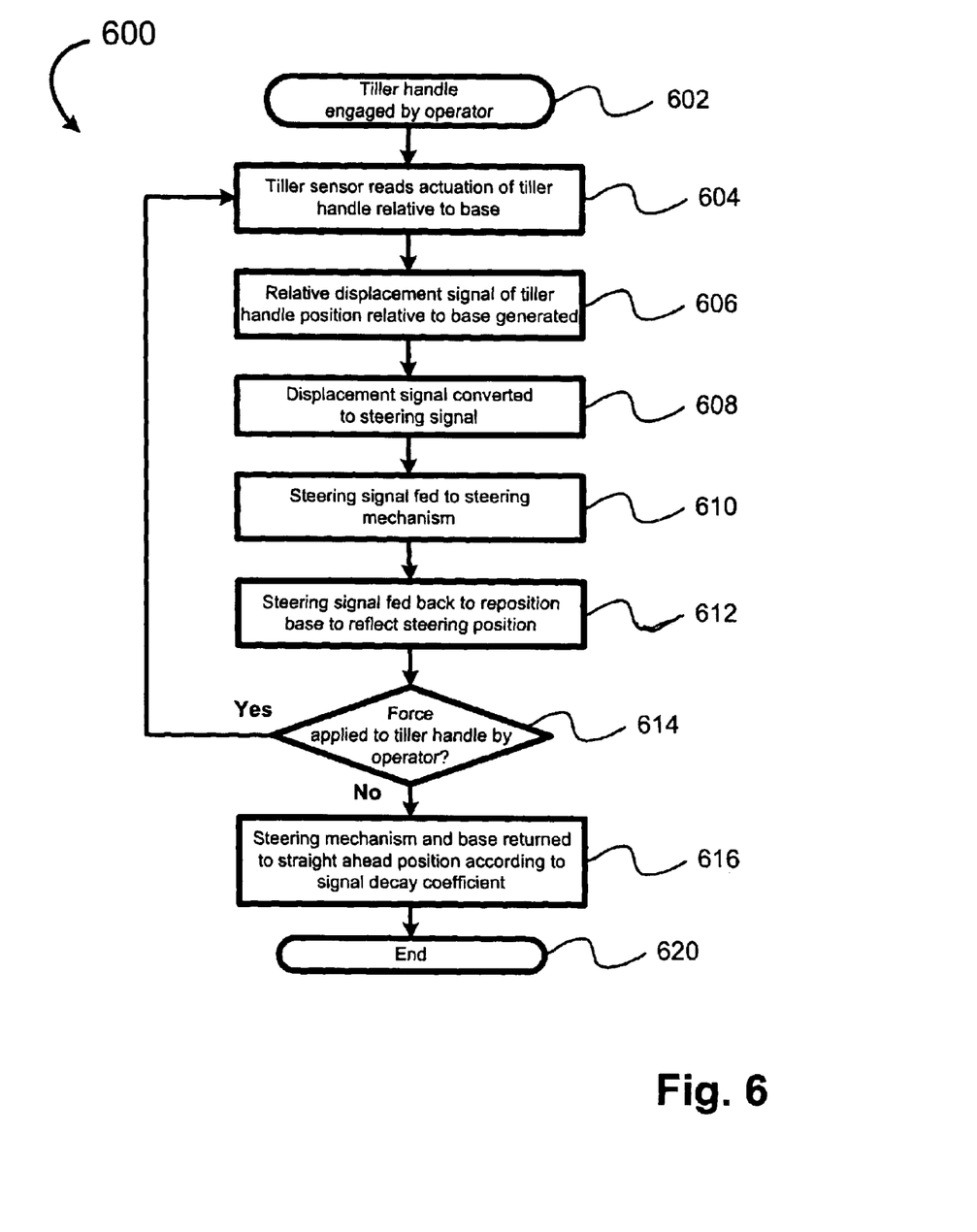
FIG. 6 is a flowchart of a routine using an embodiment of the present invention operating with a single tiller module.

FIG. 6 is a flowchart of a routine 600 using an embodiment of the present invention operating with a single tiller module. The routine 600 begins at a block 602 when the tiller handle is engaged by an operator. At a block 604 the tiller sensor reads actuation of tiller handle relative to the moveable base. As previously described, the tiller sensor can be a displacement sensor or a strain gauge. At a block 606 a relative displacement signal is generated, either directly from a displacement sensor or from a scaling factor module in response to a strain gauge reading. At a block 608, using methods previously described in connection with FIG. 3, the relative displacement signal is converted to a steering signal. At a block 610 the steering signal is supplied to the steering mechanism. At a block 612 the steering signal is also supplied to reposition the base of the tiller to reflect the current steering position, thereby providing operator feedback in the steer-by-wire system. At a decision block 614 it is determined if force continues to be applied to the tiller handle by the operator. If so, the routine 600 loops to the block 604 where the tiller sensor reads the actuation of the tiller handle relative to the base. If not, at a block 616 the steering mechanism and the tiller base are returned to the straight-ahead position according to the signal decay coefficient. Once the steering mechanism and the tiller base are returned to the straight-ahead position, the routine 600 ends at a block 620.

Figure 7:
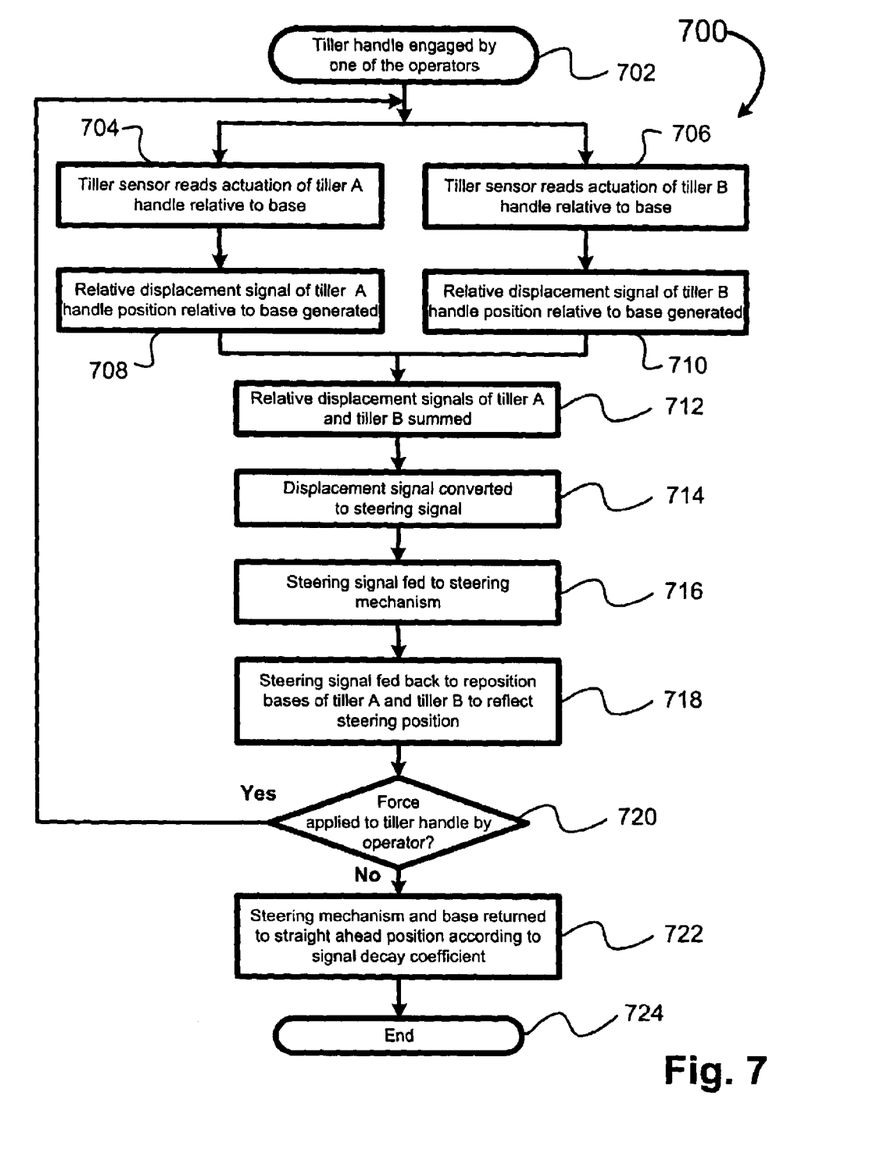
FIG. 7 is a flowchart of a routine using an embodiment of the present invention operating with two tiller modules.

FIG. 7 is a flowchart of a routine 700 using an embodiment of the present invention operating with two tiller modules. It will be appreciated that the routine 700 could be adapted to any number of tiller modules. The routine 700 begins at a block 702 when a tiller handle is engaged by one of the operators. At a block 704 a tiller sensor reads actuation of tiller handle A relative to moveable base A and, at the same time, at a block 706 a tiller sensor reads actuation of tiller handle B relative to moveable base B. At a block 708 a relative displacement signal of the tiller A relative to the base is generated and, at the same time, at a block 710 a relative displacement signal of the tiller B relative to the base is generated. At a block 712 the relative displacement signals of tiller A and tiller B are summed. At a block 714 the summed displacement signal is converted to a steering signal. At a block 716 the steering signal is supplied to the steering mechanism. At a block 718 the steering signal is also supplied to reposition the bases of tiller A and tiller B to reflect the current steering angle, thereby providing feedback to each of the operators in the steer-by-wire system. At a decision block 720 it is determined if force continues to be applied to the tiller handle by either of the operators. If so, the routine 700 loops to the blocks 704 and 706 where the tiller sensor reads the actuation of the tiller handles relative to the bases. If not, at a block 722 the steering mechanism and the tiller bases are returned to the straight ahead position according to the signal decay coefficient. Once the steering mechanism and the tiller bases are returned to the straight ahead position, the routine 700 ends at a block 724.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for generating a signal to control a steering mechanism, the system comprising:
   a tiller module configured to receive a tiller, the tiller module including:
      a moveable tiller base configured to moveably respond to a steering signal; and
      a tiller coupling configured to couple the tiller with the moveable tiller base and further configured to generate a tiller differential signal indicative of a steering force applied to the tiller relative to a position of the moveable tiller base; and
   a tiller controller configured to receive the tiller differential signal and a steering mechanism position signal, the tiller controller being further configured to generate the steering signal to direct a steering mechanism to conform with the steering force and to direct the moveable tiller base to a feedback position representative of a current position of the steering mechanism.

2. The system of claim 1, wherein the tiller coupling includes a centering spring mechanism configured to receive the tiller and allow movement of the tiller relative to the moveable tiller base within a predetermined displacement range.

3. The system of claim 2, wherein the tiller input coupling includes a tiller position transducer configured to measure a displacement of the tiller and generate the tiller differential signal.

4. The system of claim 1, wherein the tiller input coupling includes a force transducer configured to generate the tiller differential signal as a function of a strain resulting from the steering force applied to the tiller relative to the position of the moveable tiller base.

5. The system of claim 1, wherein the tiller includes a rotatable handle.

6. The system of claim 5, wherein the moveable tiller base includes a rotatable base moveable by a motor receiving the steering signal.

7. The system of claim 1, wherein the tiller controller converts the tiller differential signal into the steering signal such that the moveable tiller base is moved to cause the tiller to be aligned to a position representative of the steering mechanism position signal.

8. The system of claim 7, wherein the tiller controller integrates the tiller differential signal such that a rate of change of the steering signal is proportional to a magnitude of the steering force.

9. The system of claim 1, wherein the tiller controller further includes a steering signal decay function such that a reduction in the tiller differential signal causes a resulting reduction in the steering signal causing the steering mechanism and the moveable tiller base to return toward a neutral position.

10. The system of claim 1, wherein the tiller controller further includes a position limiter restricting the tiller such that the feedback position of the tiller is representative of the current position of the steering mechanism.

11. The system of claim 1, wherein the tiller module further comprises a plurality of tiller module components including at least one of a servo motor, a gear head, an amplifier, and a position sensor.

12. The system of claim 11, wherein the tiller module farther includes a plurality of redundant tiller module components operable to duplicate functions of at least some of the tiller module components.

13. The system of claim 1, wherein the tiller controller further comprises a plurality of tiller controller components including at least one of a summer, an integrator, and a gain device.

14. The system of claim 13, wherein the tiller controller further includes a plurality of redundant tiller controller components operable to duplicate functions of at least some of the tiller controller components.

15. The system of claim 1, wherein the system includes a secondary tiller controller operable to replace functions of the tiller controller.

16. The system of claim 1, wherein the tiller module includes:
  a first tiller module having a first moveable tiller base configured to receive a first tiller that is configured to receive a first steering force; and
  a second tiller module having a second moveable tiller base configured to receive a second tiller that is configured to receive a second steering force.

17. The system of claim 16, wherein the first tiller module generates a first tiller differential signal and the second tiller module generates a second tiller differential signal, the tiller controller summing the first tiller differential signal and the second tiller differential signal such that the steering signal is generated to direct the steering mechanism to conform with a composite of the first steering force and the second steering force.

18. The system of claim 17, wherein the steering signal causes both the first moveable tiller base and the second moveable tiller base to the feedback position representative of the current position of the steering mechanism.

19. A system for generating a signal to control a steering mechanism, the system comprising:
  a plurality of tiller modules, each of the tiller modules including:
    a moveable tiller base configured to moveably respond to a steering signal; and
    a tiller coupling configured to receive a tiller and couple the tiller with the moveable tiller base and further configured to generate a tiller differential signal reflecting a steering force applied to the tiller relative to a position of the moveable tiller base; and
  a composite tiller controller including:
    a receiver configured to receive each of the tiller differential signals and a steering mechanism position signal;
    a summing device configured to sum the tiller differential signals to generate a composite tiller differential signal to represent a composite steering force of a plurality of steering forces; and
    a signal generator configured to generate the steering signal to direct the steering mechanism to conform with the composite steering force and direct each of the moveable tiller bases to a feedback position representative of a current position of the steering mechanism.

20. The system of claim 19, wherein at least one of the tiller modules includes a centering spring mechanism configured to receive the tiller and allow movement of the tiller relative to the moveable tiller base within a predetermined displacement range.

21. The system of claim 20, wherein the tiller input coupling includes a tiller position transducer configured to measure a displacement of the tiller and generate the tiller differential signal.

22. The system of claim 19, wherein the tiller input coupling includes a force transducer configured to generate the tiller differential signal as a function of a strain resulting from the steering force applied to the tiller relative to the position of the moveable tiller base.

23. The system of claim 19, wherein the tiller includes a rotatable handle.

24. The system of claim 23, wherein the moveable tiller base includes a rotatable base moveable by a motor receiving the steering signal.

25. The system of claim 19, wherein the tiller controller converts the composite tiller differential signal into the steering signal such that the moveable tiller base is moved to cause the tiller to be aligned to a position representative of the steering mechanism position signal.

26. The system of claim 25, wherein the tiller controller integrates the composite tiller differential signal such that a rate of change of the steering signal is proportional to a magnitude of the composite steering force.

27. The system of claim 19, wherein the tiller controller further includes a steering signal decay function such that a reduction in the tiller differential signal causes a resulting reduction in the steering signal causing the steering mechanism and the moveable tiller base to return toward a neutral position.

28. The system of claim 19, wherein the tiller controller further includes a position limiter restricting the tiller such that the feedback position of the tiller is representative of the current position of the steering mechanism.

29. The system of claim 19, wherein the tiller module further comprises a plurality of tiller module components including at least one of a servo motor, a gear head, an amplifier, and a position sensor.

30. The system of claim 29, wherein the tiller module further includes a plurality of redundant tiller module components operable to duplicate functions of at least some of the tiller module components.

31. The system of claim 19, wherein the tiller controller further comprises a plurality of tiller controller components including at least one of a summer, an integrator, and a gain device.

32. The system of claim 31, wherein the tiller controller further includes a plurality of redundant tiller controller components operable to duplicate functions of at least some of the tiller controller components.

33. The system of claim 19, wherein the system includes a secondary tiller controller operable to replace functions of the tiller controller.

34. An aircraft comprising:
   a fuselage;
   at least one engine;
   at least one wing;
   a plurality of control surfaces;
   main landing gear;
   nose gear; and
   a system for generating a signal to control a steering mechanism, the system comprising:
      a tiller module configured to receive a tiller, the tiller module including:
         a moveable tiller base configured to moveably respond to a steering signal; and
         a tiller coupling configured to couple the tiller with the moveable tiller base and further configured to generate a tiller differential signal indicative of a steering force applied to the tiller relative to a position of the moveable tiller base; and
      a tiller controller configured to receive the tiller differential signal and a steering mechanism position signal, the tiller controller being further configured to generate the steering signal to direct a steering mechanism to conform with the steering force and to direct the moveable tiller base to a feedback position representative of a current position of the steering mechanism.

35. The aircraft of claim 34, wherein the tiller coupling includes a centering spring mechanism configured to receive the tiller and allow movement of the tiller relative to the moveable tiller base within a predetermined displacement range.

36. The aircraft of claim 35, wherein the tiller input coupling includes a tiller position transducer configured to measure a displacement of the tiller and generate the tiller differential signal.

37. The aircraft of claim 34, wherein the tiller input coupling includes a force transducer configured to generate the tiller differential signal as a function of a strain resulting from the steering force applied to the tiller relative to the position of the moveable tiller base.

38. The aircraft of claim 34, wherein the tiller includes a rotatable handle.

39. The aircraft of claim 38, wherein the moveable tiller base includes a rotatable base moveable by a motor receiving the steering signal.

40. The aircraft of claim 34, wherein the tiller controller converts the tiller differential signal into the steering signal such that the moveable tiller base is moved to cause the tiller to be aligned to a position representative of the steering mechanism position signal.

41. The aircraft of claim 40, wherein the tiller controller integrates the tiller differential signal such that a rate of change of the steering signal is proportional to a magnitude of the steering force.

42. The aircraft of claim 34, wherein the tiller controller further includes a steering signal decay function such that a reduction in the tiller differential signal causes a resulting reduction in the steering signal causing the steering mechanism and the moveable tiller base to return toward a neutral position.

43. The aircraft of claim 34, wherein the tiller controller further includes a position limiter restricting the tiller such that the feedback position of the tiller is representative of the current position of the steering mechanism.

44. The aircraft of claim 34, wherein the tiller module further comprises a plurality of tiller module components including at least one of a servo motor, a gear head, an amplifier, and a position sensor.

45. The aircraft of claim 44, wherein the tiller module further includes a plurality of redundant tiller module components operable to duplicate functions of at least some of the tiller module components.

46. The aircraft of claim 34, wherein the tiller controller further comprises a plurality of tiller controller components including at least one of a summer, an integrator, and a gain device.

47. The aircraft of claim 46, wherein the tiller controller further includes a plurality of redundant tiller controller components operable to duplicate functions of at least some of the tiller controller components.

48. The aircraft of claim 34, wherein the system includes a secondary tiller controller operable to replace functions of the tiller controller.

49. The aircraft of claim 34, wherein the tiller module includes:
   a first tiller module having a first moveable tiller base configured to receive a first tiller that is configured to receive a first steering force; and
   a second tiller module having a second moveable tiller base configured to receive a second tiller that is configured to receive a second steering force.

50. The aircraft of claim 49, wherein the first tiller module generates a first tiller differential signal and the second tiller module generates a second tiller differential signal, the tiller controller summing the first tiller differential signal and the second tiller differential signal such that the steering signal is generated to direct the steering mechanism to conform with a composite of the first steering force and the second steering force.

51. The aircraft of claim 50, wherein the steering signal causes both the first moveable tiller base and the second moveable tiller base to the feedback position representative of the current position of the steering mechanism.

52. A method for generating a signal to control a steering mechanism, the method comprising:
   moving a moveable tiller base in response to a steering signal;
   generating a tiller differential signal reflecting a steering force applied to a tiller relative to a position of the moveable tiller base; and
   generating the steering signal by comparing the tiller differential signal with a steering mechanism position signal, directing the steering mechanism to conform with the steering force, and directing the moveable tiller base to a feedback position representative of a current position of the steering mechanism.

53. The method of claim 52, further comprising allowing movement of the tiller relative to the moveable tiller base within a predetermined displacement range.

54. The method of claim 53, further comprising measuring the tiller differential signal by measuring a displacement of the tiller relative to the moveable tiller base.

55. The method of claim 52, wherein the tiller differential signal is measured as a function of a strain resulting from the steering force applied to the tiller relative to the position of the moveable tiller base.

56. The method of claim 52, wherein the tiller includes a rotatable handle.

57. The method of claim 56, wherein a motor moves the rotatable base in response to receiving the steering signal.

58. The method of claim 57, further comprising converting the tiller differential signal into the steering signal such that the moveable tiller base is moved to cause the tiller to be aligned to a position representative of the steering mechanism position signal.

59. The method of claim 58, further comprising integrating the tiller differential signal such that a rate of change of the steering signal is proportional to a magnitude of the steering force.

60. The method of claim 52, further comprising applying a steering signal decay function such that a reduction in the tiller differential signal causes a resulting reduction in the steering signal, thereby causing the steering mechanism and the moveable tiller base to return toward a neutral position.

61. The method of claim 52, further comprising applying a position limiter restricting movement of the tiller such that the feedback position of the tiller is representative of the current position of the steering mechanism.

62. The method of claim 52, further comprising providing a plurality of tiller module components configured to move the moveable tiller base in response to the steering signal and generate the tiller differential signal, the plurality of tiller module components including at least one of a servo motor, a gear head, an amplifier, and a position sensor.

63. The method of claim 62, further comprising providing a plurality of redundant tiller module components operable to duplicate functions of at least some of the tiller module components.

64. The method of claim 52, further comprising providing a plurality of tiller controller components configured to generate the steering signal, the tiller controller components including at least one of a summer, an integrator, and a gain device.

65. The method of claim 64, further comprising providing a plurality of redundant tiller controller components operable to duplicate functions of at least some of the tiller controller components.

66. The method of claim 52, further comprising providing a secondary tiller controller operable to replace functions of the tiller controller.

67. The method of claim 52, further comprising receiving a first tiller configured to receive a first steering force into a first moveable tiller base and receiving a second tiller configured to receive a second steering force into a second moveable tiller base.

68. The method of claim 67, further comprising generating a first tiller differential signal indicative of a first steering force applied to the first tiller and generating the second tiller differential signal indicative of a second steering force applied to a second tiller, such that the steering signal is generated to direct the steering mechanism to conform with a composite of the first steering force and the second steering force.

69. The method of claim 68, wherein the steering signal causes both the first moveable tiller base aid the second moveable tiller base to move to the feedback position representative of the current position of the steering mechanism.

70. A method for generating a signal to control a steering mechanism, the method comprising:
moving a plurality of moveable tiller bases in response to a plurality of steering signals;
generating a plurality of tiller differential signals reflecting a plurality of steering forces applied to a plurality of tillers relative to positions of the plurality of respective moveable tiller bases; and
generating the plurality of steering signals by summing the plurality of tiller differential signals to generate a composite tiller differential signal;
comparing the composite tiller differential signal and a steering mechanism position signal;
directing the steering mechanism to conform with a composite steering force of the plurality of steering forces; and
directing the plurality of moveable tiller bases to a feedback position representative of a current position of the steering mechanism.

71. The method of claim 70, further comprising allowing movement of the plurality of tillers relative to the plurality of respective moveable tiller bases within a predetermined displacement range.

72. The method of claim 71, further comprising measuring each of the plurality of tiller differential signals by measuring displacements of the plurality of tillers relative to the plurality of the respective moveable tiller bases.

73. The method of claim 70, wherein each of the plurality of tiller differential signals is measured as a function of stains resulting from the plurality of steering forces applied to the tillers relative to the positions of the plurality of respective moveable tiller bases.

74. The method of claim 70, wherein each of the plurality of tillers includes a rotatable handle.

75. The method of claim 74, wherein a motor moves each of the plurality of the respective rotatable bases in response to receiving the steering signal.

76. The method of claim 70, further comprising converting the plurality of the tiller differential signals into the steering signal such that each of the plurality of the moveable tiller bases is moved to cause each of the plurality of tillers to be aligned to a position representative of the steering mechanism position signal.

77. The method of claim 76, further comprising integrating the plurality of tiller differential signals such that a rate of change of the steering signal is proportional to a magnitude of the composite steering force.

78. The method of claim 70, further comprising applying a steering signal decay function such that a reduction in the tiller differential signal causes a resulting reduction in the steering signal causing the steering mechanism and the plurality of moveable tiller bases to return toward a neutral position.

79. The method of claim 70, further comprising applying a position limiter restricting movement of the plurality of tillers such that the feedback position of the plurality of tillers is representative of the current position of the steering mechanism.

80. The method of claim 70, further comprising providing a plurality of tiller module components configured to move the moveable tiller base in response to the steering signal and generate the tiller differential signal, the plurality of tiller module components including at least one of a servo motor, a gear head, an amplifier, and a position sensor.

81. The method of claim 80, further comprising providing a plurality of redundant tiller module components operable to duplicate functions of at least some of the tiller module components.

82. The method of claim 70, further comprising providing a plurality of tiller controller components configured to generate the steering signal, the tiller controller components including at least one of a summer, an integrator, and a gain device.

83. The method of claim 82, further comprising providing a plurality of redundant tiller controller components operable to duplicate functions of at least some of the tiller controller components.

84. The method of claim 70, further comprising providing a secondary tiller controller operable to replace functions of the tiller controller.

* * * * *